United States Patent
Saka et al.

(10) Patent No.: US 10,141,610 B2
(45) Date of Patent: Nov. 27, 2018

(54) NON-AQUEOUS ELECTROLYTE SECONDARY BATTERY AND POSITIVE ELECTRODE ACTIVE MATERIAL FOR USE IN SAME

(71) Applicant: TOYOTA JIDOSHA KABUSHIKI KAISHA, Toyota-shi, Aichi (JP)

(72) Inventors: Hideyuki Saka, Toyota (JP); Keiichi Takahashi, Nishinomiya (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 298 days.

(21) Appl. No.: 14/959,702

(22) Filed: Dec. 4, 2015

(65) Prior Publication Data

US 2016/0172663 A1 Jun. 16, 2016

(30) Foreign Application Priority Data

Dec. 10, 2014 (JP) ................. 2014-249637

(51) Int. Cl.
*H01M 4/131* (2010.01)
*H01M 10/42* (2006.01)
(Continued)

(52) U.S. Cl.
CPC ....... *H01M 10/4235* (2013.01); *H01M 4/366* (2013.01); *H01M 4/505* (2013.01);
(Continued)

(58) Field of Classification Search
CPC .. H01M 10/4235; H01M 4/366; H01M 4/505; H01M 4/525; H01M 10/0525; H01M 2004/028; H01M 4/32; H01M 4/02
(Continued)

(56) References Cited

U.S. PATENT DOCUMENTS

2007/0037055 A1* 2/2007 Yamada ................. B82Y 30/00
429/223
2007/0122703 A1 5/2007 Whitfield et al.
(Continued)

FOREIGN PATENT DOCUMENTS

CN 102709525 A 10/2012
JP 2002-025626 A 1/2002
(Continued)

OTHER PUBLICATIONS

English translation of Kikuchi, JP 2008243448 A, Oct. 2008, Japan.*

*Primary Examiner* — Jonathan G Jelsma
*Assistant Examiner* — Rashid A Alam
(74) *Attorney, Agent, or Firm* — Sughrue Mion, PLLC

(57) ABSTRACT

Provided is a non-aqueous electrolyte secondary battery combining high battery performance in normal use and endurance against overcharge. The non-aqueous electrolyte secondary battery comprises a positive electrode, a negative electrode, and a non-aqueous electrolyte. The positive electrode comprises a positive electrode active material 16. Positive electrode active material 16 is formed of a particulate lithium composite oxide 16c comprising at least lithium, nickel, cobalt, manganese and tungsten; and a nickel oxide layer 16s formed on the lithium composite oxide surface. With the non-lithium metals in lithium composite oxide 16c being 100% by mole, tungsten accounts for 0.05% by mole or greater, but 2% by mole or less. With lithium composite oxide 16c being 100 parts by mass, the nickel oxide content is 0.01 part by mass or greater, but 2 parts by mass or less.

14 Claims, 1 Drawing Sheet

(51) Int. Cl.
  *H01M 4/525* (2010.01)
  *H01M 4/505* (2010.01)
  *H01M 10/0525* (2010.01)
  *H01M 4/36* (2006.01)
  *H01M 4/02* (2006.01)

(52) U.S. Cl.
  CPC ....... *H01M 4/525* (2013.01); *H01M 10/0525* (2013.01); *H01M 2004/028* (2013.01); *Y02T 10/7011* (2013.01)

(58) Field of Classification Search
  USPC ........................................................ 429/223
  See application file for complete search history.

(56) References Cited

U.S. PATENT DOCUMENTS

| | | | |
|---|---|---|---|
| 2008/0131778 A1 | 6/2008 | Watanabe et al. | |
| 2009/0092900 A1* | 4/2009 | Obana | H01M 2/166 429/223 |
| 2015/0364798 A1* | 12/2015 | Oshima | H01M 10/0568 429/199 |

FOREIGN PATENT DOCUMENTS

| | | | | |
|---|---|---|---|---|
| JP | 2007-503102 A | | 2/2007 | |
| JP | 2008-016244 A | | 1/2008 | |
| JP | 2008243448 A | * | 10/2008 | |
| JP | 2013-073678 A | | 4/2013 | |
| JP | 2013-137947 A | | 7/2013 | |
| WO | WO 2014115538 A1 | * | 7/2014 | ........ H01M 10/0568 |

* cited by examiner

[Fig. 1]
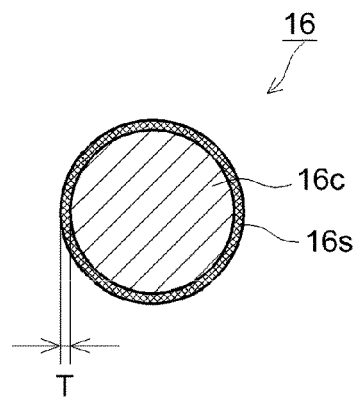
[Fig. 2]
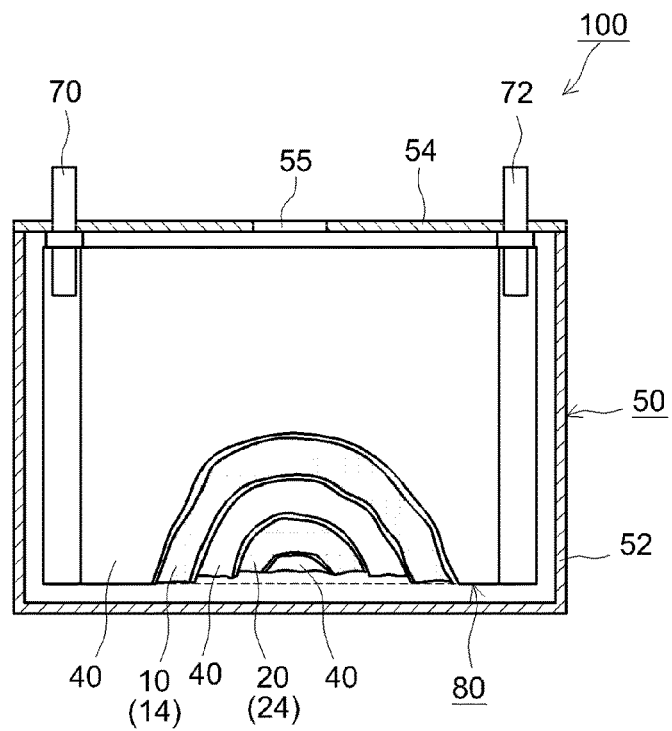

NON-AQUEOUS ELECTROLYTE SECONDARY BATTERY AND POSITIVE ELECTRODE ACTIVE MATERIAL FOR USE IN SAME

TECHNICAL FIELD

The present invention relates to a non-aqueous electrolyte secondary battery and a positive electrode active material for use in the battery.

The present application claims priority to Japanese Patent Application No. 2014-249637 filed on Dec. 10, 2014, the entire contents of which are incorporated herein by reference.

BACKGROUND ART

As for non-aqueous electrolyte secondary batteries such as lithium-ion secondary batteries, studies have been conducted to further improve the battery performance (e.g. higher capacities, greater recyclability). As a technology related to this, for instance, Patent Document 1 discloses a non-aqueous secondary battery that has a lithium transition metal composite oxide comprising manganese and tungsten in the positive electrode and further includes boehmite (alumina hydrate) between the positive and negative electrodes.

CITATION LIST

Patent Literature

[Patent Document 1] Japanese Patent Application Publication No. 2013-073678
[Patent Document 2] Japanese Patent Application Publication No. 2008-016244
[Patent Document 3] Japanese Patent Application Publication No. 2013-137947
[Patent Document 4] Japanese Patent Application Publication No. 2002-025626

SUMMARY OF INVENTION

A non-aqueous electrolyte secondary battery is usually used in a controlled state where the voltage is kept within a prescribed range (e.g. 3.0 V to 4.2 V). However, if an excess current is supplied by an operational mistake, etc., the battery may be overcharged beyond the prescribed voltage range. Further overcharge may cause disadvantages such as, for instance, an increase in the battery temperature due to the heat generated by the active material and gas formation due to decomposition of the non-aqueous electrolyte which causes expansion of the battery.

According to the studies by the present inventors, when a tungsten-containing lithium transition metal composite oxide is used as the positive electrode active material, there has been a tendency to a higher reactivity between the positive electrode and non-aqueous electrolyte. More specifically, in states of overcharge, there have been some cases such that the active material started to generate heat at a lower temperature or the amount of decomposed non-aqueous electrolyte increased. Thus, greater overcharge endurance is demanded of such a battery.

The present invention has been made under such circumstances. An objective thereof is to provide a non-aqueous electrolyte secondary battery having a positive electrode that comprises a lithium transition metal composite oxide comprising tungsten, with the battery combining high battery performance in normal use and endurance against overcharge. Another related objective is to provide a positive electrode active material capable of yielding such a battery.

The present invention provides a non-aqueous electrolyte secondary battery comprising a positive electrode, a negative electrode, and a non-aqueous electrolyte. The positive electrode comprises a positive electrode active material. The positive electrode active material is formed of a particulate lithium composite oxide comprising at least lithium, nickel, cobalt, manganese and tungsten as constituent elements; and a nickel oxide layer formed on a surface of the lithium composite oxide. With the metals other than lithium (non-lithium metals) in the lithium composite oxide being 100% by mole, tungsten accounts for 0.05% by mole or greater, but 2% by mole or less. With the lithium composite oxide being 100 parts by mass, the nickel oxide content is 0.01 part by mass or greater, but 2 parts by mass or less.

According to the studies by the present inventors, the inclusion of a lithium composite oxide having this composition can effectively reduce the IV resistance of the positive electrode. An appropriate amount of nickel oxide in the surface of the lithium composite oxide can keep the reactivity between the positive electrode and non-aqueous electrolyte at a low level, without reducing the resistance reduction effect of the tungsten addition.

As a result, the non-aqueous electrolyte secondary battery disclosed herein can combine high battery performance (e.g. high input/output performance) in normal use and endurance against overcharge.

Conventional art documents related to coating layer formation on surfaces of lithium composite oxide particles include Patent Documents 2 and 3. Patent Document 4 is a conventional art document about improving the cycle characteristics of a battery.

In a preferable embodiment of the non-aqueous electrolyte secondary battery disclosed herein, the lithium composite oxide is represented by the next general formula (I): $Li_{1+\alpha}Ni_xCo_yMn_zW_\beta A_\gamma O_2$ ($-0.05 \leq \alpha \leq 0.2$, $0.9 \leq x+y+z+\beta+\gamma \leq 1.1$, $0.3 \leq x \leq 0.7$, $0.1 \leq y \leq 0.4$, $0.1 \leq z \leq 0.4$, $0.0005 \leq \beta \leq 0.02$, $0 \leq \gamma \leq 0.02$, and A is either absent or one, two or more species of element selected from a group consisting of Na, Mg, Al, Ca, Ti, Fe, V, Cr, Zr, Nb, Mo, Hf and Ta). A lithium composite oxide having this composition can increase at least one of the following: structural stability, energy density, input/output performance, and cycle characteristics. As a result, the effect of the present invention can be produced at a higher level.

In the general formula (I), $\gamma$ can be 0. In other words, the lithium composite oxide may be free of an element A. The absence of the element A can be preferable from the standpoint of the workability and costs.

In a preferable embodiment of the non-aqueous electrolyte secondary battery disclosed herein, the nickel oxide layer has an average thickness of 1 nm or larger, but 10 nm or smaller based on an electron microscope observation. By this, the reduction of battery resistance can be combined with greater overcharge endurance at an even higher level.

In another aspect, the present invention provides a positive electrode active material for use in a non-aqueous electrolyte secondary battery. The positive electrode active material is formed of a particulate lithium composite oxide that comprises at least lithium, nickel, cobalt, manganese and tungsten as constituent elements, and a nickel oxide layer formed on a surface of the lithium composite oxide. With the non-lithium metals in the lithium composite oxide being 100% by mole, tungsten accounts for 0.05% by mole or greater, but 2% by mole or less. With the lithium composite oxide being 100 parts by mass, the nickel oxide content is 0.01 part by mass or greater, but 2 parts by mass or less. According to the positive electrode active material, a non-aqueous electrolyte secondary battery as described above (i.e. a battery that combines high battery performance in normal use and endurance against overcharge) can be preferably obtained.

The non-aqueous electrolyte secondary battery disclosed herein can combine high battery performance (e.g. high input/output performance) in normal use and endurance against overcharge at a higher level than conventional batteries. Thus, with the benefit of such characteristics, it can be preferably used, for instance, as a high-output vehicle-driving power source. That is, in another aspect disclosed herein, a vehicle is provided, comprising the non-aqueous electrolyte secondary battery.

BRIEF DESCRIPTION OF DRAWINGS

FIG. 1 shows a schematic drawing illustrating a positive electrode active material according to an embodiment of the present invention.

FIG. 2 shows a longitudinal section view schematically illustrating a cross-sectional construction of the non-aqueous electrolyte secondary battery according to an embodiment of the present invention.

DESCRIPTION OF EMBODIMENTS

Preferred embodiments of the present invention are described below. Matters (battery components not characterizing this invention, general manufacturing process of batteries, etc.) necessary to practice this invention other than those (e.g. positive electrode active material's composition and properties) specifically referred to in this description may be considered as design matters based on the conventional art in the pertinent field to a person of ordinary skill in the art. The present invention can be practiced based on the contents disclosed in this description and common technical knowledge in the subject field. In the drawings shown below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships.

Herein, first described is the positive electrode active material which is the characteristic feature of this invention and is for use in a non-aqueous electrolyte secondary battery. Later described is a non-aqueous electrolyte secondary battery that comprises the positive electrode active material.
<<Positive Electrode Active Material>>

With reference to a schematic drawing of a positive electrode active material 16 shown in FIG. 1 as an example, the positive electrode active material is described below, A particle of positive electrode active material 16 shown in FIG. 1 has a lithium composite oxide 16c as its core particle and a nickel oxide layer 16s provided to the surface of the lithium composite oxide. Typically, positive electrode active material 16 is formed of lithium composite oxide 16c and nickel oxide layer 16s.

Whether or not the surface of lithium composite oxide 16c is coated with nickel oxide layer 16s can be found out with, for instance, a general transmission electron microscope (TEM)/energy dispersive X-ray spectroscope (EDX). In a specific example, first, positive electrode active material particles 16 coated with a nickel oxide layer 16s as well as lithium composite oxide particles 16c (i.e. particles not coated with a nickel oxide layer 16s) are obtained. These particles are separately embedded and polished to expose their cross sections. The cross sections are subjected to TEM observations and the resulting TEM images are subjected to EDX analysis (mapping of the metals contained only in the lithium composite oxide 16c). The analysis data of the two can be compared to determine whether or not the surface of lithium composite oxide 16c is coated with a nickel oxide layer 16s and, if any, the extent of the coating.

Lithium composite oxide 16c comprises at least lithium (Li), nickel (Ni), cobalt (Co), manganese (Mn) and tungsten (W) as constituent elements. With the non-lithium metals forming the lithium composite oxide being 100% by mole, tungsten accounts for 0.05% by mole or greater, but 2% by mole or less.

Lithium composite oxide 16c comprising Ni, Co and Mn as constituent elements is a compound having a layered crystal structure. It shows excellent thermal stability, and has a high theoretical energy density as compared with other oxides. Thus, it can bring about excellent battery properties (e.g. high energy density, great endurance). According to the studies by the present inventors, interlayer spaces in the layered crystal structure can be broadened by partial substitution with W for the site of at least one transition metal species of Ni, Co or Mn. As a result, charge-carrying ions (e.g. Li ions) can be more smoothly inserted and released, and the resistance of the positive electrode can be reduced.

In addition, it is sometimes difficult to produce a lithium composite oxide comprising less than 0.05% by mole of tungsten. Thus, from the standpoint of the ease of production, the proportion of tungsten is preferably 0.05% by mole or greater (e.g. 0.1% by mole or greater).

Structural stability and thermal stability tend to decrease in a lithium composite oxide with more than 2% by mole of tungsten. Specifically, dissolution of the constituent metals may be likely to occur, for instance, when exposed in a high temperature environment at or above 60° C. for a long period or when used in an embodiment where high-rate charging and discharging are repeated. As a result, the durability of the battery can greatly decrease. Thus, the proportion of tungsten is preferably 2% by mole or less (e.g. 1% by mole or less).

As described above, with the proportion of tungsten being 0.05% by mole or greater, but 2% by mole or less; high battery performance can be preferably obtained for normal use.

In a preferable embodiment, the lithium composite oxide is represented by the following general formula (I):

$$Li_{1+\alpha}Ni_xCo_yMn_zW_\beta A_\gamma O_2 \quad (I)$$

Herein, x, y, z, $\beta$ and $\gamma$ are values satisfying $0.3 \leq x \leq 0.7$ (e.g. $0.3 \leq x \leq 0.5$), $0.1 \leq y \leq 0.4$ (e.g. $0.2 \leq y \leq 0.4$), $0.1 \leq z \leq 0.4$ (e.g. $0.1 \leq z \leq 0.3$), $0.0005 \leq \beta \leq 0.02$, $0 \leq \gamma \leq 0.02$, and $x+y+z+\beta+\gamma \approx 1$ (e.g. $x+y+z+\beta+\gamma = 0.9$ to $1.1$, typically $x+y+z+\beta+\gamma = 1$); and $\alpha$ is a value that satisfies $-0.05 \leq \alpha \leq 0.2$ (e.g. $0 \leq \alpha \leq 0.2$) while maintaining electrical neutrality.

When $\gamma < 0$, A is one, two or more species of element selected from a group consisting of sodium (Na), magnesium (Mg), aluminum (Al), calcium (Ca), titanium (Ti), iron (Fe), vanadium (V), chromium (Cr), zirconium (Zr), niobium (Nb), molybdenum (Mo), hafnium (Hf) and tantalum (Ta).

In the general formula (I), while the compositional ratio shown for oxygen (O) is 2, this value should not be considered exact. Some variations in the compositional ratio (e.g. being in a range of 1.95 to 2.05) are acceptable.

In the general formula (I), γ may be 0. When γ=0, the element A is absent from the general formula (I). In other words, when γ=0, the lithium composite oxide can be represented by the next general formula (II): $Li_{1+\alpha}Ni_xCo_yMn_zW_\beta O_2$ (wherein, $-0.05 \leq \alpha \leq 0.2$, $0.9 \leq x+y+z+\beta \leq 1.1$, $0.3 \leq x \leq 0.7$, $0.1 \leq y \leq 0.4$, $0.1 \leq z \leq 0.4$, $0.0005 \leq \beta \leq 0.02$).

The lithium composite oxide 16c is present as particles (particulates). For instance, it is present as secondary particles resulting from assembly (aggregation) of primary particles. The average particle diameter (secondary particle diameter) of lithium composite oxide 16c is not particularly limited. For instance, it can be about 1 μm or larger (preferably 5 μm or larger) in view of the workability when coating the particle surface with nickel oxide. From the standpoint of forming a dense, uniform positive electrode active material layer, it can be about 10 μm or smaller (preferably 9 μm or smaller).

As the average particle diameter, can be used the particle diameter at the 50th percentile ($D_{50}$ particle diameter) (from the small diameter side) of the size distribution by volume, obtained with a size analyzer based on a general laser diffraction/light scattering method.

The nickel oxide layer 16s essentially consists of nickel oxide (NiO). Herein, the term "essentially" means that the presence of inevitable impurities and a minute amount of additives or contamination with some elements forming the lithium composite oxide 16c are allowed. In other words, usually, nickel oxide accounts for 90% by mass or more of the total mass of nickel oxide layer 16s. Nickel oxide preferably accounts for 95% by mass or more (e.g. 99% by mass or more) of the total mass of nickel oxide layer 16s. In particular, it is especially preferable that the nickel oxide layer 16s consists of nickel oxide (nickel oxide accounts for 99.5% by mass or more of the total mass of nickel oxide layer 16s).

In a preferable embodiment, the nickel oxide layer 16s has an average thickness T (FIG. 1) of 1 nm or larger, but 10 nm or smaller. With the average thickness T being 1 nm or larger (e.g. 2 nm or larger), the effect of the present invention can be produced more assuredly. Furthermore, the effect can be maintained over a long period.

When the nickel oxide layer 16s is excessively thick, transport (insertion/release) of charge-carrying ions may be hindered. Thus, the average thickness T is preferably 10 nm or smaller (e.g. 5 nm or smaller). This can greatly reduce the increase in resistance of the positive electrode.

The average thickness T of nickel oxide layer 16s can be found out from a cross-sectional TEM image of positive electrode active material 16 or a positive electrode comprising the positive electrode active material. Specifically, in a given positive electrode active material 16, the shortest distance is determined from a given point in the inner surface of the nickel oxide layer 16s to the outer surface thereof. This procedure is repeated with respect to at least 10 particles (e.g. 20 particles or more) of positive electrode active material 16. The resulting values are arithmetically averaged to determine T.

In another preferable embodiment, of the total surface area of lithium composite oxide 16c, the nickel oxide layer 16s is formed on 50% or more (preferably 80% or more, e.g. almost the entire surface). According to such an embodiment, the effect of the present invention can be produced at a higher level. The surface coverage can be found out in TEM images of the particle surface.

In positive electrode active material 16, with the lithium composite oxide 16c being 100 parts by mass, the nickel oxide content is 0.01 part by mass or greater, but 2 parts by mass or less.

According to the studies by the present inventors, a tungsten-containing lithium composite oxide 16c tends to show higher reactivity with a non-aqueous electrolyte. In the art disclosed herein, a nickel oxide layer 16s is thus formed on the surface of lithium composite oxide 16c. In other words, the surface of lithium composite oxide 16c is coated with the nickel oxide layer 16s. This stabilizes the interface between the positive electrode active material 16 and non-aqueous electrolyte, decreasing the reactivity. The use of nickel oxide in the material constituting the coating layer is also effective in increasing the durability as compared with an embodiment using a material such as aluminum oxide.

In addition, when the nickel oxide content is less than 0.01 part by mass, the effect of nickel oxide layer 16s may decrease or the effect may be less persistent. Thus, from the standpoint of more suitably producing the effect of this invention, the nickel oxide content is preferably 0.01 part by mass or greater (e.g. 0.1 part by mass or greater).

When the nickel oxide content is greater than 2 parts by mass, there may be a tendency to a lower energy density of the positive electrode active material or an increase in resistance of the positive electrode. Thus, the nickel oxide content is preferably 2 parts by mass or less (e.g. 1 part by mass or less).

As described above, with the nickel oxide content being 0.01 part by mass or greater, but 2 parts by mass or less, high levels of battery performance in normal use and overcharge endurance can be combined.

Except for the above, the properties of positive electrode active material 16 are not particularly limited. For instance, from the standpoints of forming preferable conduction paths (conduction channels) among particles of the positive electrode active material 16 and of maintaining an adequate level of voids within the positive electrode active material layer to allow sufficient infiltration of a non-aqueous electrolyte, it preferably satisfies one or more of the following properties:

(1) having an average particle diameter of 1 μm or larger (preferably 5 μm or larger), but 10 μm or smaller (preferably 9 μm or smaller);

(2) in the size distribution by volume, having a particle diameter $D_{10}$ at the 10th percentile from the small particle side and a particle diameter $D_{90}$ at the 90th percentile from the small particle side, satisfying the next relationship with respect to the average particle diameter ($D_{50}$), $(D_{90}-D_{10})/D_{50} \geq 0.7$; and (3) having a tap density of 1.5 g/cm³ or higher, but 2.5 g/cm³ or lower when measured as specified in JIS K 1469 (2003). This can bring about greater battery performance (e.g. at least one of energy density, input/output performance, or durability) in normal use.

<<Method for Producing Positive Electrode Active Material>>

The method for producing the positive electrode active material disclosed herein is not particularly limited. For instance, it can be produced by a production method generally comprising the following steps:

a step (S1) of obtaining a lithium composite oxide and a nickel source (obtaining step);

a step (S2) of mixing the obtained materials in a solvent (mixing step);

a step (S3) of removing the solvent from the mixture to obtain an active material precursor (solvent removal step);

a step (S4) of washing the active material precursor with water to obtain a washed product (water-washing step);

a step (S5) of drying the washed product to obtain a dried product (drying step);

a step (S6) of calcining the dried product (calcination step).

More specifically, in the obtaining step (S1), a lithium composite oxide having a desirable composition is prepared by a heretofore known method. A nickel source is separately obtained. As the nickel source, for instance, inorganic salts of nickel such as nitrate, sulfate, chloride, silicate, etc.; as well as organic salts such as acetate, oxalate and the like can be used.

In the next mixing step (S2), the lithium composite oxide and the nickel source are mixed in a solvent. For instance, the lithium composite oxide is added to an aqueous solution containing nickel ions and mixed to uniformity. As the solvent, for instance, water can be used.

In the subsequent solvent removal step (S3), the solvent is removed (allowed to evaporate) from the mixture. The method for removing the solvent is not particularly limited, including methods such as heating the mixture, using a commercial vacuum concentrator (e.g. rotary evaporator, etc.), and so on. When the mixture is heated, heating can be carried out at a temperature (e.g. 200° C. to 500° C.) equal to or higher than the boiling point of the solvent. This results in an active material precursor having nickel adsorbed on the surface of the lithium composite oxide.

In the next water-washing step (S4), the active material precursor is washed with water. This eliminates excess nickel ions adsorbed on the surface of the lithium composite oxide. As for the conditions of water-washing, for a liter of water, the mass of active material precursor can be 750 g or greater, but 1500 g or less. When the mass of active material precursor per liter of water is less than 750 g, excessive dissolution of the lithium composite oxide may occur. When the mass of active material precursor per liter of water is greater than 1500 g, the effect of water-washing tends to decrease. This may result in a thicker nickel oxide layer or excess nickel oxide content in the positive electrode active material.

In the subsequent drying step (S5), the washed product is dried. The drying can be carried out, for instance, in the air at a temperature of 120° C. or higher, but 200° C. or lower. When the drying temperature is below 120° C., the nickel ions may not be sufficiently oxidized. When the drying temperature is above 200° C., lithium may precipitate out and migrate on the surface of the positive electrode active material. The drying time is not particularly limited. In view of the workability, for instance, it can be about several minutes to several hours.

In the calcination step (S6), the dried product is calcined. The calcination can be carried out, for instance, in the air at a temperature higher than the drying temperature. In an example, the calcining temperature can be higher by at least 100° C. than the drying temperature and can be typically 200° C. or higher, but 600° C. or lower, for instance, 300° C. or higher, but 500° C. or lower. The calcining time is not particularly limited. For instance, it can be from several minutes to several hours.

A positive electrode active material can be thus obtained, comprising nickel oxide on the surface of the lithium composite oxide.

As a preferable example, a liquid phase production method for the positive electrode active material has been described above. This method allows control of, for instance, the mixture ratio of lithium composite oxide to nickel source (S1) and the nickel oxide content by means of the amount of water used (S4) and so on.

In another preferable embodiment, for instance, a solid phase method can be employed. Specifically, a lithium composite oxide and a solid nickel source (e.g. nickel oxide) are lightly mixed and then calcined at a high temperature. By such a method, a positive electrode active material disclosed herein can be produced as well.

<<Non-Aqueous Electrolyte Secondary Battery>>

The art disclosed herein also provides a non-aqueous electrolyte secondary battery comprising the positive electrode active material described above. Such a non-aqueous electrolyte secondary battery comprises a positive electrode, a negative electrode, and a non-aqueous electrolyte.

<Positive Electrode>

The positive electrode in the non-aqueous electrolyte secondary battery disclosed herein is characterized by comprising the positive electrode active material described above. The positive electrode typically comprises a positive current collector and a positive electrode active material layer formed on the positive current collector. The positive electrode active material layer may comprise, in addition to the positive electrode active material, other optional components (e.g. binder, conductive material, etc.). As the conductive material, carbon materials can be preferably used, such as carbon black (typically, acetylene black (AB), ketjen black), activated carbon, graphite, carbon fiber, etc. As the binder, halogenated vinyl resins such as polyvinylidene fluoride (PVdF), etc., as well as polyalkylene oxides such as polyethylene oxide (PEO), etc., can be preferably used. As the positive current collector, a conductive material formed of a highly conductive metal (e.g. aluminum) can be preferably used.

<Negative Electrode>

The negative electrode in the non-aqueous electrolyte secondary battery disclosed herein typically comprises a negative current collector and a negative electrode active material layer formed on the negative current collector. The negative electrode active material layer may comprise, in addition to a negative electrode active material, other optional components (e.g. binder, thickener, etc.). As the negative electrode active material, for instance, carbon materials such as graphite, etc., can be preferably used. As the binder, styrene-butadiene rubber (SBR), polytetrafluoroethylene (PTFE), etc., can be preferably used. As the thickener, cellulose-based materials such as carboxymethyl cellulose (CMC), etc., can be preferably used. As the negative current collector, a conductive material formed of a highly conductive metal (e.g. copper) can be preferably used.

<Non-Aqueous Electrolyte>

The non-aqueous electrolyte in the non-aqueous electrolyte secondary battery disclosed herein is typically in liquid form at ambient temperature (e.g. 25° C.). In other words, it is a non-aqueous electrolyte solution. Preferably, it is always in liquid form in a given temperature range of use (e.g. −30° C. to +60° C.). As the non-aqueous electrolyte, a non-aqueous solvent containing a supporting salt can be preferably used. As the supporting salt, a lithium salt, a sodium salt, a magnesium salt, etc., can be used. In particular, lithium salts such as $LiPF_6$, $LiBF_4$ and the like can be preferably used. As the non-aqueous solvent, various organic solvents known to be usable in non-aqueous electrolyte secondary batteries can be used. Preferable examples include carbonates, ethers, esters, nitriles, sulfones, lactones and so on.

The non-aqueous electrolyte may suitably comprise various additives in addition to the components described above. Such additives may be used, for instance, for one, two or more purposes of the following: to increase the durability of the battery, to increase the initial charge/discharge efficiency, to increase the input/output performance, to increase the overcharge endurance, and so on. Specific examples of additives include lithium bis(oxalato)borate (LiBOB), lithium difluoro(bis(oxalato))phosphate (LPFO), vinylene carbonate (VC), vinyl ethylene carbonate (VEC), biphenyl (BP), cyclohexylbenzene (CHB), etc.

<Embodiment of Non-Aqueous Electrolyte Secondary Battery>

Described below is a non-aqueous electrolyte secondary battery (single cell) according to, but not particularly limited to, an embodiment of the present invention.

FIG. 2 shows a longitudinal section view schematically illustrating a cross-sectional construction of a non-aqueous electrolyte secondary battery 100. The non-aqueous electrolyte secondary battery 100 comprises a flat, wound electrode body (wound electrode body) 80, a non-aqueous electrolyte not shown in the drawing, and a flat, box-shaped battery case 50.

Battery case 50 comprises a flat cuboid (square) main battery casing 52 having a top opening and further comprises a lid 54 to close the opening. As the material of battery case 50, a relatively light metal (e.g. aluminum or an aluminum alloy) can be preferably used. The top face (i.e. lid 54) of battery case 50 comprises a positive terminal 70 and a negative terminal 72 for external connection. Lid 54 comprises a safety valve 55 to release gas produced inside the battery case 50 to the outside.

Battery case 50 internally houses the flat wound electrode body 80 and the non-aqueous electrolyte not shown in the drawing. Wound electrode body 80 comprises a long sheet of positive electrode (a positive electrode sheet) 10 and a long sheet of negative electrode (a negative electrode sheet) 20. Positive electrode sheet 10 comprises a long sheet of positive current collector and, on at least one face thereof, a band of positive electrode active material layer 14 formed along the length direction. Negative electrode sheet 20 comprises a long sheet of negative current collector and, on at least one face thereof, a band of negative electrode active material layer 24 formed along the length direction. Between positive electrode active material layer 14 and negative electrode active material layer 24, two long sheets of separator (separator sheets) 40 are placed as insulating layers to prevent direct contacts between the two. As the separator sheet 40, a porous resin sheet formed of a resin such as polyethylene (PE), polypropylene (PP), polyester, cellulose, polyamide, etc., as well as non-woven fabric and the like can be preferably used.

In the central region of the width direction (which extends from one end to the other end of the winding axis) of wound electrode body 80, there is formed a wound core where the positive electrode active material layer 14 and negative electrode active material layer 24 are tightly layered. At the two ends of the width direction of wound electrode body 80, a positive electrode active material layer-free region of positive electrode sheet 10 and a negative electrode active material layer-free region of negative electrode sheet 20 protrude out of the wound core. The positive current collector is present at the positive electrode-side protrusion (i.e. the positive electrode active material-free region). The negative current collector is present at the negative electrode-side protrusion (i.e. the negative electrode active material layer-free region). The positive and negative current collectors are electrically connected to the positive terminal 70 and negative terminal 72, respectively.

Non-aqueous electrolyte secondary battery 100 having such a construction can be produced by a production method generally comprising, for instance, an assembly-constructing step (S10); a conditioning step (S20); and a high-temperature aging step (S30).

Specifically, first, positive electrode sheet 10 and negative electrode sheet 20 are layered via separator sheets 40 and wound flat, thereby to fabricate a wound electrode body 80. Subsequently, the wound electrode body 80 and a non-aqueous electrolyte are placed in the battery case 50 to construct an assembly (S10).

An external power source is then connected between positive electrode 10 (positive terminal 70) and negative electrode 20 (negative terminal 72) of the constructed assembly. The assembly is charged until the voltage across the positive and negative electrodes reaches a certain value (e.g. 3 V or higher, preferably 3.5 V or higher) (S20).

The assembly in such a state of charge is then stored in a high temperature environment for a given time period. The assembly is usually stored at a temperature of 40° C. or higher, for instance, 50° C. or higher, preferably 60° C. or higher. The storage time is usually about 1 to 48 hours, for instance, about 1 to 5 hours. This can result in formation of a good quality coating (e.g. highly dense, low-resistance coating) on the surface of the positive electrode active material (S30). According to the studies by the present inventors, when the high-temperature aging step (S30) is not performed, the effect of the present invention may be reduced or less likely obtained. Thus, it is preferable that the production method includes the step (S30).

<Applications of Non-Aqueous Electrolyte Secondary Battery>

The non-aqueous electrolyte secondary battery disclosed herein can be used in various applications while combining high battery performance (e.g. high input/output performance) in normal use and endurance against overcharge at a higher level than conventional batteries. Accordingly, with the benefit of such features, it can be preferably used, for instance, as a vehicle-driving, high-output power source installed in a vehicle such as a plug-in hybrid automobile, hybrid automobile, electric automobile, etc.

Some working examples related to the present invention are described below, but the present invention is not limited to such specific examples.

<<1. Studies on Amount of Tungsten Added to Lithium Composite Oxide>>

As positive electrode active materials of Examples 1 to 4 and Reference Example 1, positive electrode active materials were prepared, varied solely in tungsten (W) content in a given lithium composite oxide.

Specifically, were dissolved in water nickel sulfate ($NiSO_4$) as a Ni source, cobalt sulfate ($CoSO_4$) as a Co source and manganese sulfate ($MnSO_4$) as a Mn source to prepare an aqueous solution A containing Ni, Co and Mn at the molar ratio shown in Table 1. Separately, was dissolved in water ammonium tungstate ($5(NH_4)_2O.12WO_3$) as a W source to prepare an aqueous solution B containing W. The resulting aqueous solutions A and B were then mixed at the molar ratio shown in Table 1 under basic conditions to obtain a composite hydroxide (precursor hydroxide) containing Ni, Co, Mn and W Subsequently, the precursor hydroxide was mixed with lithium carbonate $Li_2CO_3$ as a lithium source at the molar ratio shown in Table 1 and the mixture was calcined in air atmosphere. The calcined product was cooled, crushed and sieved to obtain a lithium composite oxide having the composition shown in Table 1.

The resulting lithium composite oxide was then mixed with an aqueous solution of nickel nitrate (Ni(NO$_3$)$_2$). The mixture was heated at 400° C. to remove the solvent from the mixture, whereby an active material precursor was obtained.

Subsequently, the active material precursor was washed (with water). For this, to a liter of water, the mass of active material precursor was 0.8 kg.

The resulting washed product was allowed to dry in the air at 150° C. and then calcined in the air at 400° C. for five hours.

According to the above, were prepared positive electrode active materials having nickel oxide on the surface of the lithium composite oxide (Examples 1-4, Reference Example 1, average particle diameters 5 μm to 9 μm).

As for Reference Examples 2 to 4, the W-containing aqueous solution B was not used and/or nickel oxide was not adsorbed on the surface of the lithium composite oxide, but otherwise in the same manner as the above, positive electrode active materials (Reference Examples 2-4) were prepared.

Each positive electrode active material prepared, acetylene black as a conductive material and polyvinylidene fluoride (PVdF) as a binder were weighed out to a mass ratio of these materials of 90:8:2 and mixed with N-methylpyrrolidone to prepare a positive electrode slurry. The slurry was applied in a band to each face of a long sheet of aluminum foil (positive current collector) with an average thickness of 15 μm, dried and then pressed to fabricate a positive electrode sheet (overall thickness: 120 μm) having positive electrode active material layers on the positive current collector.

Graphite as a negative electrode active material, styrene-butadiene rubber (SBR) as a binder and carboxymethyl cellulose (CMC) as a thickener were weighed out to a mass ratio of these materials of 98:1:1 and mixed with ion-exchanged water to prepare a negative electrode slurry. The slurry was applied in a band to each face of a long sheet of copper foil (negative current collector) with an average thickness of 10 μm, dried and then pressed to fabricate a negative electrode sheet (overall thickness: 130 μm) having negative electrode active material layers on the negative current collector.

The fabricated positive electrode sheet and negative electrode sheet were layered via separator sheets and wound flat to form a wound electrode body. As the separator sheet, was used a porous film (overall thickness: 24 μm) having a three-layer structure formed of polyethylene (PE)/polypropylene (PP)/polyethylene (PE).

To a solvent mixture containing ethylene carbonate (EC), dimethyl carbonate (DMC) and ethyl methyl carbonate (EMC) at a volume ratio of 3:3:4, was dissolved LiPF$_6$ as a supporting salt to a concentration of 1 mol/L to prepare a non-aqueous electrolyte solution.

The wound electrode body and non-aqueous electrolyte solution were then placed in a flat battery case and sealed to construct an assembly. The assembly was conditioned by constant-current (CC) charging at a 0.2 C rate to a battery voltage of 3.8 V. The charged assembly was left standing and aged in an environment at a temperature of 65° C. for three or more hours. In such a way, non-aqueous electrolyte secondary batteries (Examples 1-4 and Reference Example 1-4, battery design capacity: 25 Ah) were constructed.

<Measurement of Initial Properties>
Initial Capacity (Battery Capacity)

In an environment at a temperature of 25° C., the constructed non-aqueous electrolyte secondary batteries were charged and discharged as described below to check that their battery capacities (CCCV discharge capacities here) were approximately 25 Ah:

(1) CC charging at a 0.2 C rate to a battery voltage of 4.1 V (2) CC discharging at a 0.2 C rate to a battery voltage of 3.0 V followed by constant-voltage (CV) discharging to a 0.01 C current rate.

Initial Resistance

In an environment at a temperature of 25° C., the batteries were adjusted to 60% SOC (state of charge) and 20% SOC and CC-discharged each at a 10 C rate for 10 seconds. The voltage drops during this were divided by the current values to determine the IV resistance. Their arithmetic mean values were recorded as their initial resistance. The results are shown in the corresponding column in Table 1.

<Cycle Characteristics>

In an environment at a temperature of 25° C., after 500 cycles of charging and discharging at a 2 C rate from/to 3.0 V to/from 4.1 V, the batteries were adjusted to 60% SOC, and the IV resistance was determined in the same manner as the initial resistance. From the initial resistance and IV resistance after 500 cycles at 60% SOC, the percent (%) increase in resistance was determined by the next equation: (IV resistance after 500 cycles/initial resistance)×100(%). The results are shown in the corresponding column in Table 1.

<Overcharge Endurance>

In an environment at a temperature of −10° C., the batteries were CC-charged at 40 A until the maximum voltage reached was 10 V. They were then inspected for the presence of undesired conditions such as elevated battery temperature, etc. The results are shown in the corresponding column in Table 1. In Table 1, "Good" indicates that no undesired conditions were observed while "Poor" indicates that some undesired conditions were observed.

TABLE 1 compositions of positive electrode active materials and test results of battery performance I

| | Positive electrode active material | | | | Battery characteristics | | |
|---|---|---|---|---|---|---|---|
| | Lithium composite oxide | | Nickel oxide layer | | | Cycle | |
| | W content (mol %) | Compositional formula | NiO (parts by mass) | Thickness (nm) | Initial resistance (mΩ) | characteristics % increase in resistance | Overcharge endurance |
| Ex. 1 | 0.05 | LiNi$_{0.33}$Co$_{0.33}$Mn$_{0.33}$W$_{0.0005}$O$_2$ | 0.5 | 3 | 53 | 1.1 | Good |
| Ex. 2 | 0.1 | LiNi$_{0.33}$Co$_{0.33}$Mn$_{0.33}$W$_{0.001}$O$_2$ | | | 51 | 1.1 | Good |

TABLE 1-continued compositions of positive electrode active materials
and test results of battery performance I

| | Positive electrode active material | | Nickel oxide layer | | Battery characteristics | | |
|---|---|---|---|---|---|---|---|
| | Lithium composite oxide | | | | | Cycle | |
| | W content (mol %) | Compositional formula | NiO (parts by mass) | Thickness (nm) | Initial resistance (mΩ) | characteristics % increase in resistance | Overcharge endurance |
| Ex. 3 | 1 | $LiNi_{0.33}Co_{0.33}MN_{0.33}W_{0.01}O_2$ | — | — | 52 | 1.1 | Good |
| Ex. 4 | 2 | $LiNi_{0.33}Co_{0.33}Mn_{0.33}W_{0.02}O_2$ | — | — | 52 | 1.1 | Good |
| Ref. Ex. 1 | 5 | $LiNi_{0.33}Co_{0.33}Mn_{0.33}W_{0.05}O_2$ | — | — | 51 | 1.2 | Poor |
| Ref. Ex. 2 | 0 | $LiNi_{0.33}Co_{0.33}Mn_{0.33}O_2$ | — | — | 62 | 2.1 | Good |
| Ref. Ex. 3 | 1 | $LiNi_{0.33}Co_{0.33}Mn_{0.33}W_{0.01}O_2$ | — | — | 49 | 1.3 | Poor |
| Ref. Ex. 4 | 0 | $LiNi_{0.33}Co_{0.33}Mn_{0.33}O_2$ | 1 | 5 | 58 | 1.8 | Good |

As shown in Table 1, Reference Examples 2 and 4 showed relatively high initial resistance and high percent increase in resistance after 500 cycles. With respect to Reference Examples 1 and 3, while the initial resistance and percent increase in resistance after 500 cycles were both low, they showed poor overcharge endurance.

On the contrary to these reference examples, Examples 1 to 4 showed low initial resistance and low percent increase in resistance after 500 cycles as well as good overcharge endurance. As for a reason of the low initial resistance, the present inventions consider the insertion of W in some transition metal sites in the layered structure of Ni, Co and Mn. In other words, hexavalent tungsten atoms strongly attract divalent oxygen atoms to broaden the interlayer distance. It is thought to result in smooth insertion and release of lithium ions, bringing about a reduction in the resistance. As for a reason of the good overcharge endurance, the suitable adsorption of nickel oxide on the surface of the tungsten-containing lithium composite oxide is thought to have decreased the reactivity between the positive electrode active material and non-aqueous electrolyte. In other words, the art disclosed herein can bring about both reduced resistance and increased overcharge endurance.

<<2. Studies on Nickel Oxide Layer>>

Herein, while keeping the tungsten content of the lithium composite oxide constant, preferable amounts of nickel oxide in the nickel oxide layer were examined. Specifically, the amounts of nickel nitrate added and/or amount of water for the water-washing were adjusted to obtain the nickel oxide contents shown in Table 2 relative to 100 parts by mass of the lithium composite oxide. Otherwise, in the same manner as Example 2 above, were constructed non-aqueous electrolyte secondary batteries according to Examples 5 to 8 and Reference Example 5. In addition, the tungsten content was modified to 0.1% by mole, but otherwise in the same manner as Reference Example 3 above, a non-aqueous electrolyte secondary battery according to Reference Example 6 was constructed. The constructed batteries were tested for the battery characteristics. The results are shown in Table 2.

TABLE 2 compositions of positive electrode active materials
and test results of battery performance II

| | Positive electrode active material | | Nickel oxide layer | | Battery characteristics | | |
|---|---|---|---|---|---|---|---|
| | Lithium composite oxide | | | | | Cycle | |
| | W content (mol %) | Compositional formula | NiO (parts by mass) | Thickness (nm) | Initial resistance (mΩ) | characteristics % increase in resistance | Overcharge endurance |
| Ex. 5 | 0.1 | $LiNi_{0.33}Co_{0.33}Mn_{0.33}W_{0.001}O_2$ | 0.01 | 1 | 51 | 1.1 | Good |
| Ex. 6 | | | 0.1 | 3 | 52 | 1.1 | Good |
| (Ex. 2) | | | 0.5 | 4 | 51 | 1.1 | Good |
| Ex. 7 | | | 1 | 5 | 54 | 1.1 | Good |
| Ex. 8 | | | 2 | 10 | 55 | 1.2 | Good |
| Ref. Ex. 5 | | | 5 | 24 | 62 | 1.8 | Good |
| Ref. Ex. 6 | | | — | — | 49 | 1.3 | Poor |

As shown in Table 2, Reference Example 5 showed relatively high initial resistance and high percent increase in resistance after 500 cycles. With respect to Reference Example 6, while the initial resistance and percent increase in resistance after 500 cycles were both low, it showed poor overcharge endurance.

On the contrary to these reference examples, Examples 5 to 8—with 0.01 part by mass to 2 parts by mass of nickel oxide added to 100 parts by mass of the lithium composite oxide (i.e. with 1 nm to 10 nm thick nickel oxide layers)—showed low initial resistance and low percent increase in resistance after 500 cycles as well as good overcharge endurance.

<<3. Studies on Species of Element Added to Lithium Composite Oxide>>

Herein, while keeping the amount of nickel oxide in the nickel oxide layer constant, studies were conducted on preferable species of element added to the lithium composite oxide. Specifically, in place of the W source, a Zr source, Mo source, Nb source and Ta source were used, respectively, but otherwise in the same manner as Example 6 above, were constructed non-aqueous electrolyte secondary batteries according to Reference Examples 7 to 10. The constructed batteries were tested for the battery characteristics. The results are shown in Table 3.

54 lid
55 safety valve
70 positive terminal
72 negative terminal
80 wound electrode body
100 non-aqueous electrolyte secondary battery

TABLE 3 compositions of positive electrode active materials and test results of battery performance III

| | Positive electrode active material | | | | Battery characteristics | | |
|---|---|---|---|---|---|---|---|
| | Lithium composite oxide | | Nickel oxide layer | | | Cycle characteristics | |
| | | | NiO | | Initial | | |
| | Element added | Compositional formula | (parts by mass) | Thickness (nm) | resistance (mΩ) | % increase in resistance | Overcharge endurance |
| (Ex. 6) | W | $LiNi_{0.33}Co_{0.33}Mn_{0.33}W_{0.001}O_2$ | 0.1 | 3 | 52 | 1.1 | Good |
| Ref. Ex. 7 | Zr | $LiNi_{0.33}Co_{0.33}Mn_{0.33}Zr_{0.001}O_2$ | | | 59 | 1.1 | Good |
| Ref. Ex. 8 | Mo | $LiNi_{0.33}Co_{0.33}Mn_{0.33}Mo_{0.001}O_2$ | | | 60 | 1.4 | Good |
| Ref. Ex. 9 | Nb | $LiNi_{0.33}Co_{0.33}Mn_{0.33}Nb_{0.001}O_2$ | | | 58 | 1.3 | Poor |
| Ref. Ex. 10 | Ta | $LiNi_{0.33}Co_{0.33}Mn_{0.33}Ta_{0.001}O_2$ | | | 62 | 1.2 | Poor |

As shown in Table 3, Reference Examples 7 to 10 all showed relatively high initial resistance as compared with Example 6. Reference Examples 9 and 10 further showed relatively high percent increase in resistance and also poor overcharge endurance. In other words, when Zr, Mo, Nb, or Ta is used in place of W as the species of element added to the lithium composite oxide, the effect of the present invention is not produced. As a reason for this, the present inventors consider that the bonding strength between the added element and oxygen atoms had decreased the structural stability of the lithium composite oxide.

Based on the results of studies 1 to 3 described above, input/output performance and overcharge endurance can be combined at a high level by the selective use of a positive electrode active material satisfying the following conditions: (1) with the non-lithium metals constituting the lithium composite oxide being 100% by mole, tungsten accounts for 0.05% by mole or greater, but 2% by mole or less; and (2) with the lithium composite oxide being 100 parts by mass, the nickel oxide content is 0.01 part by mass or greater, but 2 parts by mass or less.

Although the present invention has been described in detail above, the described embodiments and working examples are merely for illustrations. The invention disclosed herein includes various modifications and changes made to the specific embodiments illustrated above.

REFERENCE SIGNS LIST 10 positive electrode sheet (positive electrode)
14 positive electrode active material layer
16 positive electrode active material
16c lithium composite oxide (lithium composite oxide particle)
16s nickel oxide layer
20 negative electrode sheet (negative electrode)
24 negative electrode active material layer
40 separator sheet (separator)
50 battery case
52 main battery casing

The invention claimed is:

1. A non-aqueous electrolyte secondary battery comprising a positive electrode, a negative electrode, and a non-aqueous electrolyte, wherein
the positive electrode comprises a positive electrode active material,
the positive electrode active material is formed of a particulate lithium composite oxide comprising at least lithium, nickel, cobalt, manganese and tungsten as constituent elements; and a nickel oxide layer formed on a surface of the lithium composite oxide;
with the metals other than lithium in the lithium composite oxide being 100% by mole, tungsten accounts for 0.05% by mole or greater, but 2% by mole or less;
with the lithium composite oxide being 100 parts by mass, the nickel oxide content is 0.01 part by mass or greater, but 2 parts by mass or less; and
nickel oxide accounts for 90% by mass or more of a total mass of the nickel oxide layer.

2. The non-aqueous electrolyte secondary battery according to claim 1, wherein the nickel oxide layer has an average thickness of 1 nm or larger, but 10 nm or smaller based on an electron microscope observation.

3. The non-aqueous electrolyte secondary battery according to claim 1, wherein, with the metals other than lithium in the lithium composite oxide being 100% by mole, tungsten accounts for 0.05% by mole or greater, but 0.1% by mole or less.

4. The non-aqueous electrolyte secondary battery according to claim 1, wherein nickel oxide accounts for 95% by mass or more of a total mass of the nickel oxide layer.

5. The non-aqueous electrolyte secondary battery according to claim 1, wherein nickel oxide accounts for 99% by mass or more of a total mass of the nickel oxide layer.

6. The non-aqueous electrolyte secondary battery according to claim 1, wherein the nickel oxide layer has an average thickness of 1 nm or larger, but 5 nm or smaller based on an electron microscope observation.

7. The non-aqueous electrolyte secondary battery according to claim 1, wherein the nickel oxide layer has an average thickness of 2 nm or larger, but 10 nm or smaller based on an electron microscope observation.

8. The non-aqueous electrolyte secondary battery according to claim 1, wherein the nickel oxide layer has an average thickness of 2 nm or larger, but 5 nm or smaller based on an electron microscope observation.

9. The non-aqueous electrolyte secondary battery according to claim 1, wherein nickel oxide accounts for 99.5% by mass or more of a total mass of the nickel oxide layer.

10. The non-aqueous electrolyte secondary battery according to claim 9, wherein the nickel oxide layer has an average thickness of 1 nm or larger, but 10 nm or smaller based on an electron microscope observation.

11. The non-aqueous electrolyte secondary battery according to claim 9, wherein the nickel oxide layer has an average thickness of 2 nm or larger, but 5 nm or smaller based on an electron microscope observation.

12. The non-aqueous electrolyte secondary battery according to claim 1, wherein the lithium composite oxide is represented by formula (I):

$$Li_{1+\alpha}Ni_xCo_yMn_zW_\beta A_\gamma O_2 \qquad (I)$$

(wherein $-0.05 \leq \alpha \leq 0.2$, $0.9 \leq x+y+z+\beta+\gamma \leq 1.1$, $0.3 \leq x \leq 0.7$, $0.1 \leq y \leq 0.4$, $0.1 \leq z \leq 0.4$, $0.0005 \leq \beta \leq 0.02$, $0 \leq \gamma \leq 0.02$, and A is either absent or one, two or more species of element selected from a group consisting of Na, Mg, Al, Ca, Ti, Fe, V, Cr, Zr, Nb, Mo, Hf) and Ta.

13. The non-aqueous electrolyte secondary battery according to claim 12, wherein $\gamma$ in the general formula (I) is 0.

14. A positive electrode active material for use in a non-aqueous electrolyte secondary battery, with the positive electrode active material being formed of a particulate lithium composite oxide that comprises at least lithium, nickel, cobalt, manganese and tungsten as constituent elements, and a nickel oxide layer formed on a surface of the lithium composite oxide, wherein with the non-lithium metals in the lithium composite oxide being 100% by mole, tungsten accounts for 0.05% by mole or greater, but 2% by mole or less;

with the lithium composite oxide being 100 parts by mass, the nickel oxide content is 0.01 part by mass or greater, but 2 parts by mass or less; and nickel oxide accounts for 90% by mass or more of a total mass of the nickel oxide layer.

* * * * *